(12) United States Patent
Sokhin et al.

(10) Patent No.: US 11,928,051 B2
(45) Date of Patent: Mar. 12, 2024

(54) TEST SPACE SAMPLING FOR MODEL-BASED BIASED RANDOM SYSTEM TEST THROUGH REST API

(71) Applicant: International Business Machines Corporation, Armonk, NY (US)

(72) Inventors: Vitali Sokhin, Haifa (IL); Gil Eliezer Shurek, Haifa (IL); Shiri Moran, Kiryat Tivon (IL); Tom Kolan, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 17/806,799

(22) Filed: Jun. 14, 2022

(65) Prior Publication Data

US 2022/0382670 A1 Dec. 1, 2022

Related U.S. Application Data

(63) Continuation-in-part of application No. 17/333,640, filed on May 28, 2021, now Pat. No. 11,748,238.

(51) Int. Cl.
*G06F 11/00* (2006.01)
*G06F 11/36* (2006.01)

(52) U.S. Cl.
CPC ...... *G06F 11/3688* (2013.01); *G06F 11/3684* (2013.01); *G06F 11/3692* (2013.01)

(58) Field of Classification Search
CPC ............ G06F 11/3684; G06F 11/3688; G06F 11/3692; H04L 67/133
See application file for complete search history.

(56) References Cited

U.S. PATENT DOCUMENTS

| 7,549,144 | B2 | 6/2009 | Jubran |
| 10,013,340 | B1 | 7/2018 | Quadros |
| 10,042,728 | B1 | 8/2018 | Kuzmin |
| 10,437,712 | B1 | 10/2019 | Tyler |
| 11,507,496 | B2 | 11/2022 | Edwards |
| 11,544,656 | B1* | 1/2023 | Manzano Doñabeitia ................. G06F 11/3676 |
| 2003/0188044 | A1* | 10/2003 | Bohizic ................. G06F 11/263 719/328 |
| 2006/0174174 | A1* | 8/2006 | Bohizic ............ G01R 31/31835 714/724 |

(Continued)

FOREIGN PATENT DOCUMENTS

CN 113489672 A 10/2021

OTHER PUBLICATIONS

U.S. Appl. No. 17/333,640, "Notice of References Cited," dated Dec. 22, 2022.

(Continued)

*Primary Examiner* — Joshua P Lottich
(74) *Attorney, Agent, or Firm* — Richard B. Thomas

(57) ABSTRACT

A system, program product, and method for validating a system under test (SUT). The method includes generating one or more application programming interface (API) requests. The method also includes selecting one or more random biases for one or more properties of the one or more API requests. The method further includes generating a random sample of one or more values from an input domain space, wherein the one or more values are associated with one or more respective fields of the API being requested.

20 Claims, 10 Drawing Sheets

(56) References Cited

U.S. PATENT DOCUMENTS

| | | |
|---|---|---|
| 2011/0145653 A1 | 6/2011 | Broadfoot |
| 2020/0133744 A1 | 4/2020 | Macleod |
| 2020/0210258 A1 | 7/2020 | Cramer |
| 2020/0364127 A1 | 11/2020 | White |
| 2021/0011837 A1 | 1/2021 | Coppa |

OTHER PUBLICATIONS

A. Arcuri, "RESTful API Automated Test Case Generation," 2017 IEEE International Conference on Software Quality, Reliability and Security (QRS), 2017, pp. 9-20, doi: 10.1109/QRS.2017.11.

List of IBM Patents or Patent Applications Treated as Related, signed Jun. 14, 2022, 2 pages.

Mell et al., "The NIST Definition of Cloud Computing," Recommendations of the National Institute of Standards and Technology, U.S. Department of Commerce, Special Publication 800-145, Sep. 2011, 7 pages.

Viglianisi et al., "RESTTESTGEN: Automated Black-Box Testing of RESTful APIs," 2020 IEEE 13th International Conference on Software Testing, Validation and Verification (ICST), Oct. 24-28, 2020, 11 pages.

Zhang, M., Marculescu, B. & Arcuri, A. Resource and dependency based test case generation for RESTful Web services. Empir Software Eng 26, 76 (2021). https://doi.org/10.1007/s10664-020-09937-1.

* cited by examiner

TEST SPACE SAMPLING FOR MODEL-BASED BIASED RANDOM SYSTEM TEST THROUGH REST API

BACKGROUND

The present disclosure relates to validating systems through multiple computing environments, and, more specifically, to testing the respective systems through a model-based, biased, and random test regime via the respective representational state transfer (REST) application programming interfaces (APIs).

Many known modern computing systems and applications communicate through programmatic interfaces such as REST APIs. Therefore, testing of an associated system (i.e., system under test, or SUT) includes testing of the REST APIs. At least some known traditional methods of testing the REST APIs include manually written tests, fuzz testing, algorithmic test generation, random test generation, and metamorphic testing.

SUMMARY

A system, computer program product, and method are presented for testing of SUTs through REST APIs.

In one aspect, a computer system is presented to validate a system under test (SUT). The system includes one or more processing devices. The system also includes one or more memory devices communicatively and operably coupled to the one or more processing devices. The system further includes a test generation module communicatively and operably coupled to the one or more processing devices. The test generation module is configured to generate one or more application programming interface (API) requests and select one or more random biases for one or more properties of the one or more API requests. The system also includes a test space sample generator module communicatively and operably coupled to the test generation module and the one or more processing devices. The test space sample generator module is configured to generate a random sample of one or more values from an input domain space. The one or more values are associated with one or more respective fields of the API being requested, and the one or more random biases include the random sample of the one or more values.

In another aspect, a computer program product is presented. The computer program product is embodied on at least one computer readable storage medium having computer executable instructions for validating a system under test (SUT) that when executed cause one or more computing devices to generate one or more application programming interface (API) requests including generate a random sample of one or more values from an input domain space, wherein the one or more values are associated with one or more respective fields of the API being requested.

In yet another aspect, a computer-implemented method is presented for validating a system under test (SUT). The method includes generating one or more application programming interface (API) requests. The method further includes selecting one or more random biases for one or more properties of the one or more API requests. The method also includes generating a random sample of one or more values from an input domain space, wherein the one or more values are associated with one or more respective fields of the API being requested.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
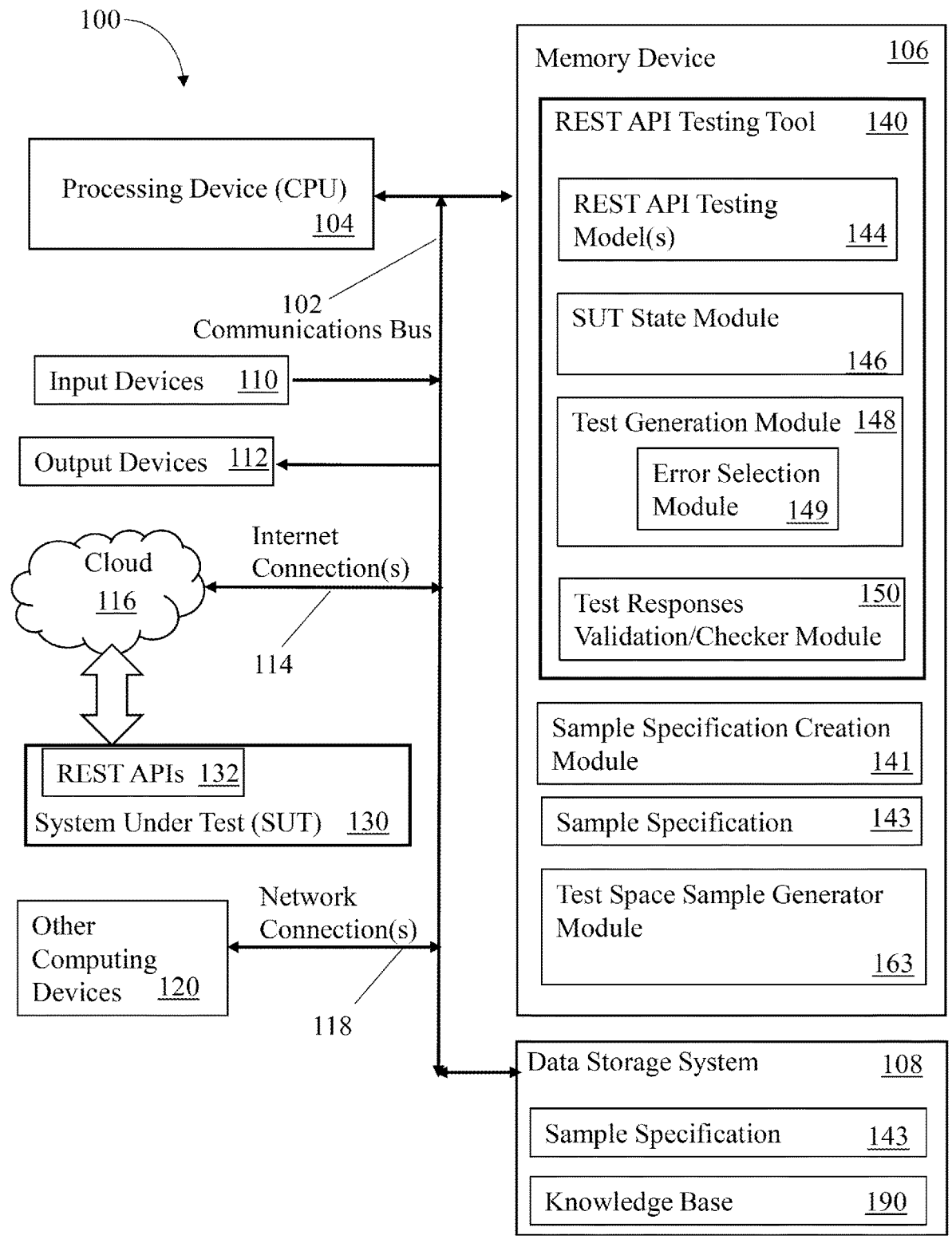
FIG. 1 is a block schematic diagram illustrating a computer system configured for testing of SUTs through REST APIs, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure relate to validating systems under test (SUTs) through a model-based, biased, and random test regime via the respective representational state transfer (REST) application programming interfaces (APIs). While the present disclosure is not necessarily limited to such applications, various aspects of the disclosure may be appreciated through a discussion of various examples using this context.

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Many known applications and systems, including those applications and systems that are cloud-based, a data center, and stand-alone servers, use application programming interfaces (APIs) to facilitate communications between a client or user. Many of these communications are transmitted by and an application or system through a cloud-based infrastructure. In general, an API is an interface that defines interactions between multiple software applications or mixed hardware-software intermediaries through a set of definitions, standards, and protocols for building and integrating application software to facilitate internal communications within the internal infrastructure of internal computing systems as well as the aforementioned cloud-based communications. However, the APIs are not themselves the definitions, standards, and protocols. In at least some embodiments, an API is a mechanism that enables an application or service to access a resource within another application or service. The application or service doing the accessing is called the client, and the application or service containing the resource is called the server.

For example, and without limitation, an API may be used to define the types of calls (i.e., Hypertext Transfer Protocol (HTTP) requests) that can be made, how to make them, the data formats that should be used, the conventions to follow, etc. In addition, the API facilitates transmission of a response to the call from the application/system. Therefore, in at least some aspects, an API may act as a mediator between the users or clients of a particular application or system and the resources or web services for which they desire access. For such users and clients, the APIs are substantially transparent and provide a method for an organization to share resources and information while maintaining security, control, and authentication through determining who gets access to what. In general, the APIs are resident within a portion of the respective application or system to most effectively provide the specific functionality to the users/clients.

Many known modern internal and cloud-based computing systems and applications use REST APIs. REST is an acronym for representational state transfer, where, for example, and without limitation, a client may request a resource using a REST API and the server transfers back the current state of the resource in a standardized representation. In general, a resource in the present context is any piece of information that the API can provide the client. For instance, a resource in a social media application's API could be a user, a page, a photo, or a post. The REST API is configured to execute one or more of creation, addition, and deletion of different resources as well as use resources that already exist. Therefore, REST APIs may be configured to receive requests for a resource and generate a response that returns relevant information about the requested resource, i.e., the state of the resource, where the response is translated into a format that clients can easily interpret as determined by the API receiving the requests. Clients can also modify items on the server and even add new items to the server through a REST API.

Testing of an associated system (i.e., system under test, or SUT) includes validation testing of the associated REST APIs. More specifically, the SUT is tested through the REST API layer where some logic such as that associated with validation of request parameters resident within the REST API layer is also tested. At least some known traditional methods of testing the REST APIs include manually written tests, fuzz testing, algorithmic test generation, random test generation, and metamorphic testing. However, in general, such testing mechanisms tend to be biased toward valid requests that will produce expected results, and are typically not configured to traverse the spectrum of erroneous, i.e., invalid requests. The valid requests are configured to validate the required functional of the SUT. The invalid requests are inserted to occasionally validate the performance of the SUT in rejecting such requests and transmitting an error notification to the user rather than testing any other functionality of the SUT. As used herein, the term "path" refers to an operational path through the SUT, including the various paths through the APIs, application(s), and associated hardware. In some circumstances, the user may elect to test only a portion of the respective SUT, e.g., and without limitation, one or more applications out of a suite of applications, and particular portions of the associated hardware. The valid requests use those paths through the SUT for which the respective testing scenarios are configured to test known features that will likely return satisfactory results with little to no identified deficiencies. Therefore, the respective testing is configured to expose otherwise hidden deficiencies and/or unexpected behaviors. However, many of the known testing mechanisms cannot generate the desired range of tests to locate the unknown deficiencies through the SUT.

Manually written tests may be configured to validate elaborated use cases; however, they are typically drafted for targeting a specific SUT, provide a relatively low level of coverage due to only targeting problems anticipated by the authors of the tests, are labor-intensive, and require frequent maintenance.

Fuzz testing is an automated software testing technique that involves changing valid tests to provide invalid, unexpected, or random data as inputs to a SUT. The SUT is then monitored for respective responses, i.e., checking of the responses is performed. However, fuzz testing does not facilitate providing test conditions that press against the boundaries of the SUT's features, especially if there are various dependencies between different API calls. In addition, the testing is very limited, usually only targeting server error responses. Moreover, fuzz testing does not use state information of the SUT.

Algorithmic test generation uses some type of algorithm (e.g., an evolutionary algorithm that mimics the behaviors of living things) to generate random tests, which will create tests that meet predetermined criteria, with meaningful interactions; however, satisfactory distance functions (i.e., functions that provide a distance between elements of a set where the difference between the respective elements is proportional to the distance) are required to guide the search. Also, as with fuzz testing, without a state of the system, the tests results are unpredictable, and therefore the checking is limited.

Metamorphic testing concentrates on the test oracle problem, i.e., the difficulty of determining the expected outcomes of selected test cases or to determine whether the actual outputs agree with the expected outcomes. In general, metamorphic testing is configured to, instead of checking the end result, perform the checking on some invariants that should hold across multiple executions of tests, for example that $\min(2,3)=\min(3,2)$. However, metamorphic testing only focuses on whether a specific test being run has failed or not and does not use the state of the SUT.

Random test generation randomizes valid API request generation, according to the relevant technical specification, for example, OpenAPI schema, transmits the requests, and validates the syntax of the response; however, this method is limited in the coverage space it can reach and the subsequent checking (as in previous methods). Random test generation does not use a state of the SUT.

In general, random test generation requires a mechanism to sample an input domain space. At least one known such mechanism includes employment of a sampling function that is described by assigning a weight ($w_n$) for each possible value ($v_n$) or a range of values, (for example $v_1:w_1$, $v_2:w_2$, $v_3:w_3$, . . . ) and using a weighted random generator to produce a sequence of samples. Such method works for independent inputs with relatively small domains and where sampling does not depend on the SUT state, for example, creating samples for booleans, integer ranges (e.g., age), and enums (a special data type for a variable that includes a set of predefined constants, e.g., days of the week).

With respect to REST APIs, a sample typically includes many, often interdependent, primitive fields, where selection of a value for a field "A" affects a value for a field "B." Additionally, there are structural constraints which must be considered to create a valid sample. For example, whether a field is required, or there is a "oneOf" selection between multiple fields. Moreover, sampling certain fields depends on a SUT state, for example, a resource id field which references a resource dynamically created and deleted during test execution. Additional requirements can include the need to create samples based on field semantics, for example, instead of providing random strings for a field named "surname," a sample generator will produce strings resembling real surnames. Accordingly, the generation of samples for respective fields within specified constraints facilitates the employment of REST APIs.

A system, computer program product, and method are disclosed and described herein for conducting model-based, biased, random test generation for SUT testing through REST APIs, where the state of the SUT is continuously monitored and updated through the testing activities. The system, computer program product, and method are configured to combine random, biased, model-based validation test generation with a continuously updated state of the SUT to bias the automatic generation of the validation tests towards valid requests. Moreover, semantic checking based on the discovered state of the SUT further enhances the SUT testing.

In at least some embodiments, the system is a validation testing system that is configured as either, or both, a system and a computer program product configured to execute one or more computer-implemented methods of validation tests for a SUT. The system includes one or more validation testing models. At least one of the embodiments of the validation testing model used herein represents the range of API calls, or requests, that are expected to be transmitted to the respective REST APIs embedded in the SUT. More specifically, the model includes descriptions of the syntax for the API requests and the respective API responses, as well as the dependencies between different resources presented in the SUT. Moreover, the model contains both syntactic and semantic descriptions of the respective API requests embodied as schemas specifying valid syntax for API requests and API responses as well as the dependencies between the different resources presented in the SUT. In at least some embodiments, the model is configured to bias the generation of the API requests towards successful transactions. Accordingly, the system includes a model to facilitate enhancement of the validation testing as described herein.

In one or more embodiments, the state of the SUT is constantly recorded and used to enhance the validation testing of the SUT. The state of the SUT is represented through the resources that exist in the SUT as perceived by observing the API responses that have been received. To establish the known state of the SUT, the system is configured to record the descriptions of newly created and deleted resources as well as resources which already exist, including those resources that were modified. The known state facilitates improving the predictability of the validation tests that in turn improves the checking features (described further herein). Accordingly, the state of the SUT is constantly recorded as it evolves throughout the validation testing.

In at least some embodiments, the system also includes one or more validation test generators that are configured to automatically generate validation tests. Such API request generation creates substantially syntactically and semantically valid API requests through biasing the generated API requests through biasing mechanisms that include, without limitation, random selection of one or more tester inputs (discussed further herein), selection of API request syntaxes and resource dependencies from the model, selection of the present state of the SUT, random intentional selection of errors, and randomly biasing the properties of the API requests.

In one or more embodiments, the random selection of tester inputs includes generating a plurality of valid samples specifically tailored for REST API operations. A sample specification is created that describes a structure of a REST API request, along with any structural constraints, and defines how the samples are to be generated. In some embodiments, the creating of the sample specification includes downloading an OpenAPI specification from any source thereof, automatically adding predefined sampling functions based on information collected from the OpenAPI specification, automatically adding field dependencies, and adding testing knowledge bias either manually or automatically. For each instance of a tester preparing to send a REST API request, a single sample is generated from the sample specification. In some embodiments, the generation of the samples includes resolving any structural constraints associated with the respective REST API being requested, creating a random sample generation order based on dependencies between the aforementioned sampling functions, and generating a value for each field through an established set of rules. Accordingly, a one-time creation of a sample specification and sample generation therefrom facilitates calling REST APIs.

The generator transmits the API requests to the SUT, where at least some of the API requests include one or more of the previously mentioned biasing mechanisms, where some of the biases are selected randomly to enhance the robustness of the testing. The information contained in the state is used to bias the random generator towards semantically valid requests, as well as to predict the API responses.

In some embodiments, the system includes a checker that is configured to validate the API response transmitted from the SUT in response to the API request. In addition, the checker is configured to predict the API response to the present API request through the present state. The actual API response status code is compared to the predicted (or expected) status code and the response content is compared to the predicted content. Therefore, the checker is further configured to validate the syntactic and semantic correctness of the API response from the SUT. In addition, if the response is syntactically correct, the checker is configured to add, update, and remove resources within the recorded state of the SUT (or, at least the portions thereof under test) through the test execution, such that the recorded state of the SUT is consistently in flux. The syntactic correctness, or lack thereof, of the API responses is automatically inferred from the model through a comparison by the checker and syntactically incorrect API responses may include an illegal status code and a syntactically illegal response body. Moreover, for the semantic checking, the checker uses the model and the state to predict an expected status code as well as API response content, which are both compared to the actual API response.

Referring to FIG. 1, a block schematic diagram is provided illustrating a computer system, i.e., a validation testing system 100 (herein referred to as "the system 100") that is configured for testing of a system under test (SUT) through representational state transfer (REST) application programming interfaces (APIs), in accordance with some embodiments of the present disclosure. The system 100 includes one or more processing devices 104 (only one shown) communicatively and operably coupled to one or more memory devices 106 (only one shown). The system 100 also includes a data storage system 108 that is communicatively coupled to the processing device 104 and memory device 106 through a communications bus 102. The system 100 further includes one or more input devices 110 and one or more output devices 112 communicatively coupled to the communications bus 102. In addition, the system 100 includes one or more Internet connections 114 (only one shown) communicatively coupled to the cloud 116 through the communications bus 102, and one or more network connections 118 (only one shown) communicatively coupled to one or more other computing devices 120 through the communications bus 102. In some embodiments, the Internet connections 114 facilitate communication between the system 100 and one or more cloud-based centralized systems and/or services (not shown in FIG. 1).

In at least some embodiments, the system 100 is a portion of a cloud computing environment (see FIG. 4), e.g., and without limitation, system 100 is a computer system/server that may be used as a portion of a cloud-based systems and communications environment through the cloud 116 and the Internet connections 114. In some embodiments, the system 100 is operatively and communicatively coupled to one or more systems under test (SUTs) 130 (only one shown) through the cloud 116. Many of the embodiments as described further herein are cloud-based; however, the validation systems, computer program products, and methods as presented in the exemplary embodiments herein are configurable for any computing system configurations, including validation testing of strictly internal communications.

In one or more embodiments, a REST API testing tool 140, herein referred to as "the tool 140", is resident within the memory device 106 to facilitate testing of the SUT 130. The tool 140 communicates with the SUT 130 through one or more REST APIs 132 resident within the SUT 130. In one or more embodiments, the tool 140 includes one or more REST API testing models 144 (herein referred to as "the model 144"). In some embodiments, the model 144 includes descriptions of the syntax for the API requests and the respective API responses, as well as the dependencies between different resources presented in the SUT 130. Moreover, the model 144 contains syntactic descriptions of the respective API requests embodied as schemas specifying valid syntax for API requests and API responses as well as the dependencies between the different resources presented in the SUT. In at least some embodiments, the model 144 is configured to bias the generation of the API requests towards successful transactions. Accordingly, the system 100 includes the model 144 to facilitate enhancement of the validation testing as described herein.

In at least some embodiments, the tool 140 also includes a SUT state module 146. The SUT state module 146 is communicatively coupled to the model 144 and is configured to receive modeled resource dependencies of the resources in the SUT 130 from the model 144. The SUT state module 146 is further configured to capture the actual resource state of the SUT 130 through one or more of direct observation of the state of the SUT 130 through the respective communications conduits (not shown) or through the actual API responses that are indicative of any changes made to the affected resources since the REST APIs are the principle mechanism for such resource management. Therefore, the SUT state module 146 is also configured to capture the add/update/remove resources actions and alter the representation of the present state of the SUT 130 within the SUT state module 146 accordingly. The information contained in the actual resource state is used to bias the random generation of the API requests for the validation testing towards semantically valid requests with the actual state of the SUT 130, as well as to predict the API responses. Accordingly, the actual resource state of the SUT 130 is captured through direct measurement thereof and the modeled resource dependencies.

In some embodiments, the tool 140 further includes a test generation module 148, herein referred to as "the generator 148," that includes an error selection module 149. In some embodiments, the error selection module 149 is a separate module external to the generator 148. The generator 148 is communicatively and operably coupled to the SUT state module 146 and the SUT 130. The generator 148 is configured to automatically generate validation tests through one or more tester input biases, API request syntaxes and resource dependencies from the model 144, the present resource state of the SUT 130 through the SUT state module 146, and randomly biased properties of the API request. Such API request generation creates a substantially syntactically and semantically valid API request in which at least a portion of the inputs to the generation of the API request are randomized and are configured to bias the API requests to increase the robust nature of the validation testing. The generator 148 is also configured to automatically generate errors through the error selection module 149 through modifying a valid request into an invalid request to test the response of the SUT 130 to such invalid requests. The generator 148 is also configured to transmit the API request to the REST APIs 132 in the SUT 130 through the cloud 116 and the Internet connections 114.

In one or more embodiments, the tool 140 also includes a test responses validation/checker module 150, herein referred to as "the checker 150," that is communicatively and operably coupled to the SUT 130, and the state module 146. The checker 150 is configured to generate a prediction of the incoming API response transmitted from the SUT 130 through predicting the expected status code as well as the content of the API responses. The predictions directed toward the respective API responses are at least partially based on respective API response syntax, resource relations, and operational semantics transmitted to the checker 150 from the model 144 the resource state transmitted to the checker 150 from the SUT state module 146. The checker 150 is further configured to compare the predicted content of the API response with the actual API response as transmitted from the SUT 130. The checker 150 is also configured to update the state of the SUT 130 as a function of the API response and the validation thereof, and the model 144.

In at least some embodiments, a sample specification creation module 141 is resident within the memory device 106. The sample specification creation module 141 is configured to receive the OpenAPI specification (not shown in FIG. 1) that is configured for the particular API operations as selected by the user. The OpenAPI specification is collected through any mechanism that enables operation of the system 100 as described herein, including, without limitation, through the input devices 110, the Internet connection 114, and the network connection 118. In some embodiments, the OpenAPI specification is resident within the data storage system 108. The OpenAPI specification is discussed further herein with respect to FIG. 3. The Open API specification is used to create a sample specification 143, also discussed further herein, that in some embodiments is resident within the data storage system 108 until it is required to be resident within the memory device 106.

In some embodiments, a test space sample generator module 163 is resident in the memory device 106 and is communicatively and operably coupled to the SUT 130, and the tool 140. In some embodiments, the test space sample generator module 163 is communicatively and operably coupled to the memory device 106 from a cloud-based device through the cloud 116 and the Internet connection 114, or through another computing device 120 through the network connection 118. In some embodiments, the test space sample generator module 163 is resident within the tool 140. The test space sample generator module 163 is configured to execute the random selection of tester inputs, where the tester inputs are to be injected into the test generation module 148. More specifically, the test space sample generator module 163 is configured to generate a plurality of valid samples specifically tailored for subsequent REST API operations through automatically creating a sample specification that describes a structure of a REST API request, along with any structural constraints, where the sample specification also defines how the samples are to be generated. The test space sample generator module 163 is further configured to generate a single sample from the sample specification 143 for each instance of a tester preparing to send a REST API request.

Figure 2A:
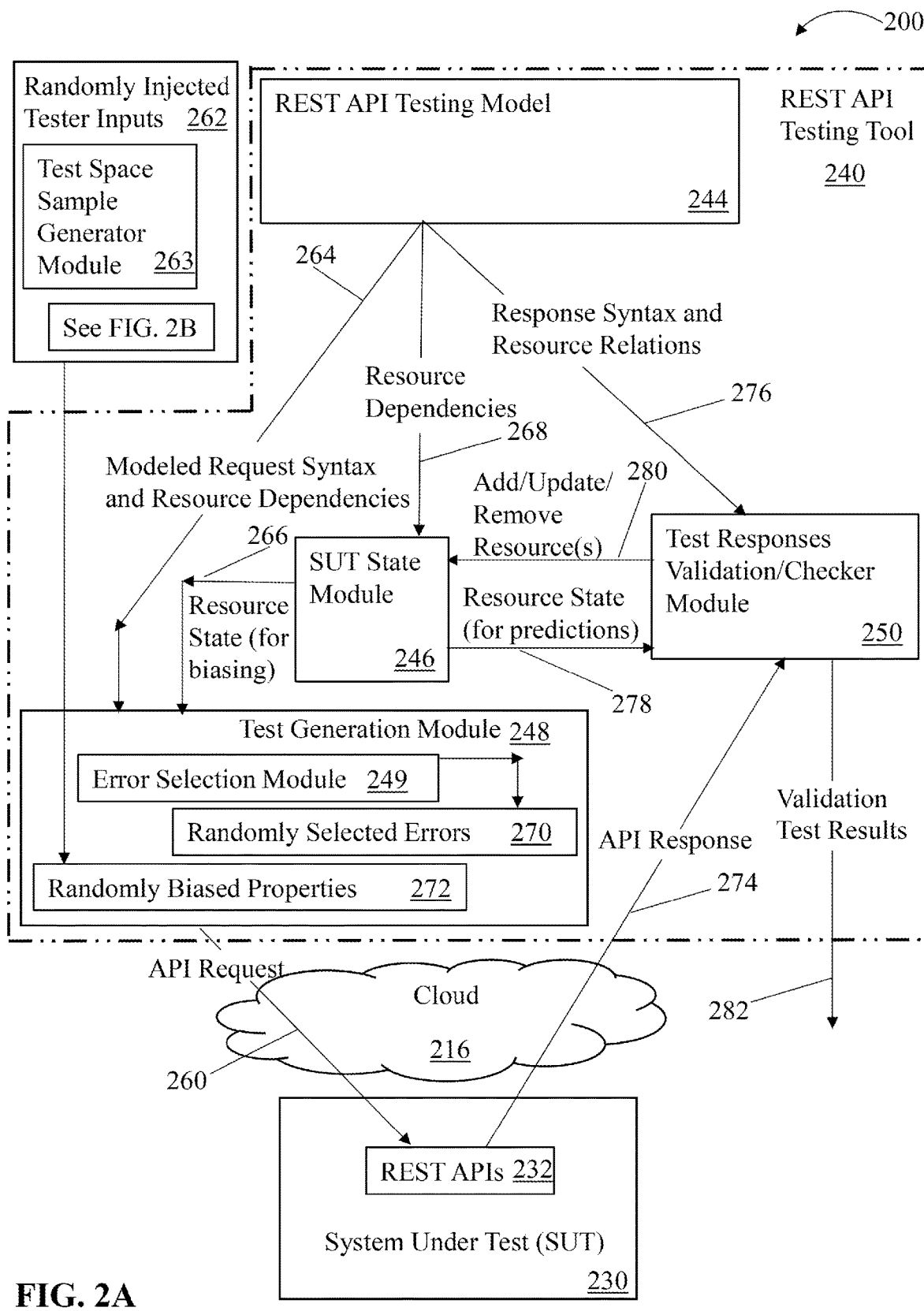
FIG. 2A is a block schematic diagram illustrating the relationships between a REST API testing tool and a SUT, in accordance with some embodiments of the present disclosure.
Figure 2B:
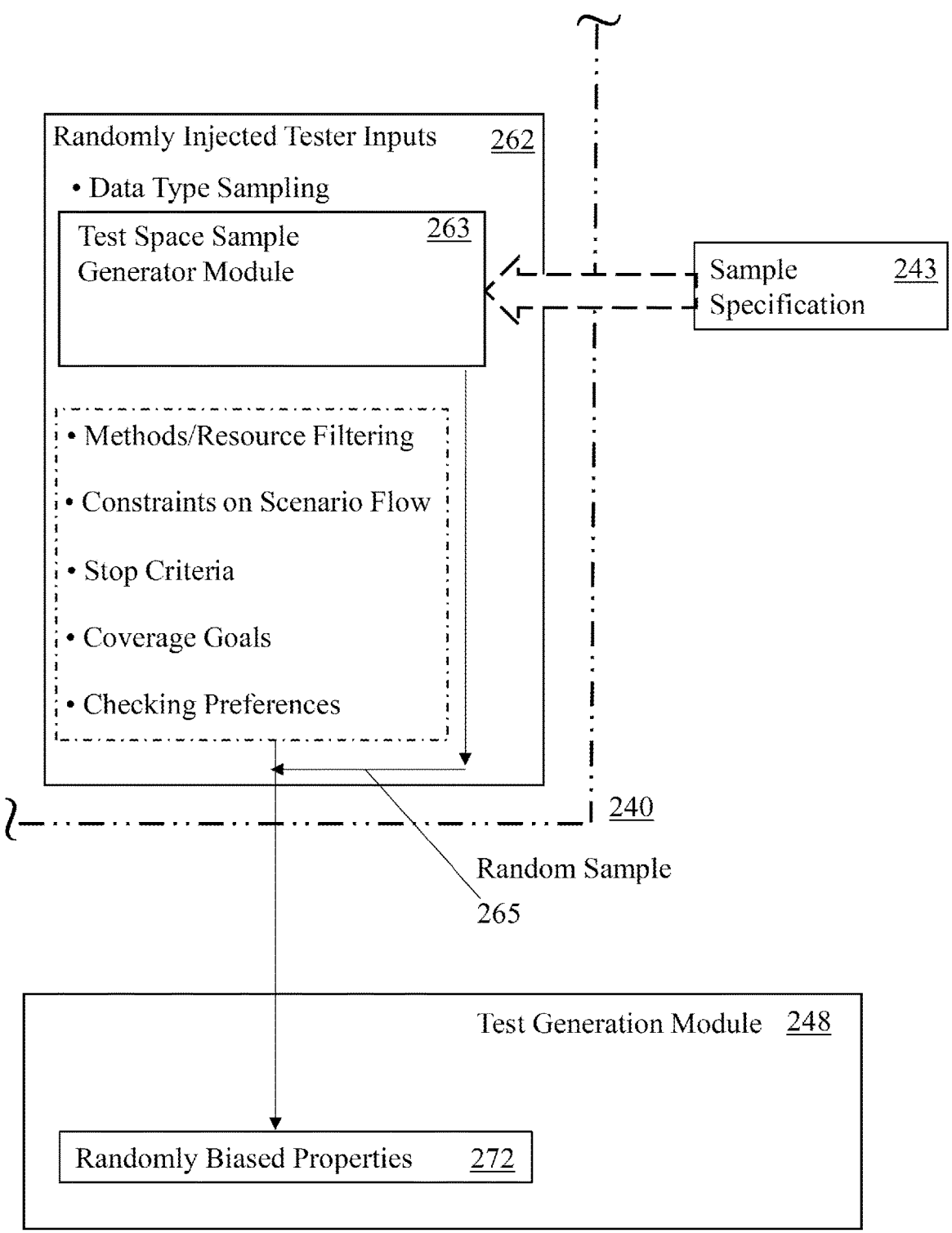
FIG. 2B is a block schematic diagram illustrating a test space sample generator module, in accordance with some embodiments of the present disclosure.

In at least some embodiments, the data storage system 108 provides storage to, and without limitation, a knowledge base 190 that includes any data that may be used to facilitate operation of the REST API testing tool 140 as described herein, including without limitation, the REST API testing models 144 that are generated prior to the operations described with respect to FIGS. 2 and 3 herein. Referring to FIG. 2A, a block schematic diagram is provided illustrating the relationships 200 between the REST API testing tool 240 and the SUT 230 (both also shown in FIG. 1 as 140 and 130, respectively), in accordance with some embodiments of the present disclosure. FIG. 2A includes at least a portion of those components also shown in FIG. 1 with similar numbering. FIG. 2A is referred to further with respect to FIGS. 2B, 4A, and 4B.

Referring to FIG. 2B, a block schematic diagram is provided illustrating randomly injected tester inputs 262, including the test space sample generator module 263 (referred to as the test space sample generator module 163 in FIG. 1), in accordance with some embodiments of the present disclosure. FIG. 2B provides an expanded view of the respective portions of FIG. 2A. Also shown in FIG. 2B are the random samples 265 generated by the test space sample generator module 263 and transmitted to the test generation module 248. As previously described with respect to FIG. 1, the shown embodiment for the test space sample generator module 263 is external to the tool 240; however, regardless of the physical placement of the test space sample generator module 263, the associated functionality described herein is substantially unchanged. Continuing to refer to FIG. 1, as well as FIG. 2A, one of such randomly biased properties 272 includes one or more tester inputs 262 that are automatically and randomly selected for inclusion for the API request 260. The selection of the tester (or user) inputs into the generator 248 increases the robust nature of the biased inputs into the validation testing, with additional biasing discussed further herein. The tester inputs 262 include, without limitation, data type sampling (discussed further herein with respect to the test space sample generator module 263), methods and resource filtering, constraints on the test scenario flows, stop criteria, coverage goals, and checking preferences. In some embodiments, the tester inputs 262 reside within one of the knowledge base 190, an external input device 110, the cloud 116, and another computing device 120, where they may be accessed through the tool 140 through one or more communications conduits, such as, and without limitation, the communications bus 102, the Internet connection 114, and the network connection 118 (see FIG. 1). In some embodiments, the tester inputs 262 reside in the memory device 106.

As used herein, a "test space" is an abstraction which does not have physical representation within the figures presented herein. The test space for a specific API operation is a multi-dimensional space where the respective multi-dimensional axes correspond to the API request properties, and the respective domains in the test space match the domains of the properties. For example, in one embodiment, where an API operation is configured to receive a person's gender and age, a two-dimensional test space is defined therefrom. The respective age axis has domain of 0 to 120 (years), and the gender axis has a two-value domain, i.e., male and female. The test space is described as having a sample specification which determines that there is the "gender" property with a binary domain and an "age" property with an integer domain which is limited to (0, 120). Each time a sample is generated, a tuple consisting of gender and age is generated and transmitted, e.g., and without limitation, (F,10) and (M,120)

for a 10-year old female and a 120-year old male, respectively. For those embodiments with more than two properties and axes, the respective test spaces are much larger and more complicated. In the embodiments described herein, the test spaces have any number of axes necessary to enable operation of the system 100 also as described herein. The terms "test space," "sample space," "sampling space," and "input domain space" are used interchangeably herein. Accordingly, the test space is configured to be sampled as discussed further herein.

In at least some embodiments, the tool 240 includes the one or more REST API testing models 244 (herein referred to as "the models 244"). At least one of the models 244 represents the range of REST API calls, or requests 260 for such calls, that are expected to be transmitted as requests 260 to the respective REST APIs 232 embedded in the SUT 230. More specifically, the model 244 includes descriptions of the syntax for the API requests 260 and the respective API responses 274, as well as the dependencies between different resources presented in the SUT 230. Moreover, the model 244 contains both syntactic and semantic descriptions of the respective API requests 260 embodied as schemas specifying valid syntax for API requests 260 and API responses 274 as well as the dependencies between the different resources presented in the SUT. In at least some embodiments, the model 244 is configured to bias the generation of the API requests 260 towards successful transactions. In some embodiments, the test space sample generator module 263 is configured to receive the sample specification 243 (shown as the sample specification 143 in FIG. 1), where the creation of the sample specification 243 is discussed further with respect to FIGS. 3A and 3B. Accordingly, the model 244 facilitates enhancement of the validation testing as described herein.

Figure 3A:
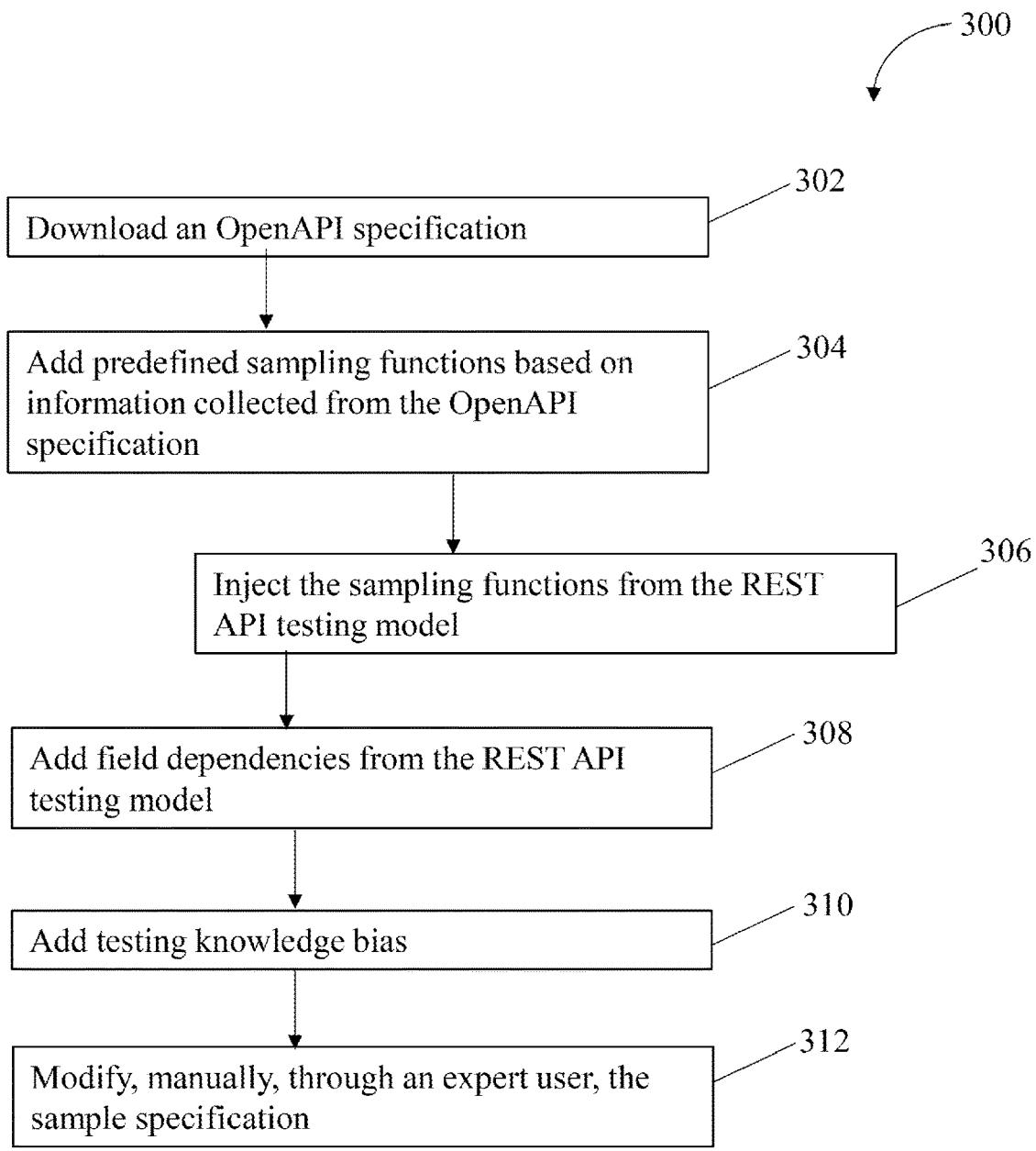
FIG. 3A is a flowchart illustrating a process for creating a sample specification, in accordance with some embodiments of the present disclosure.
Figure 3B:
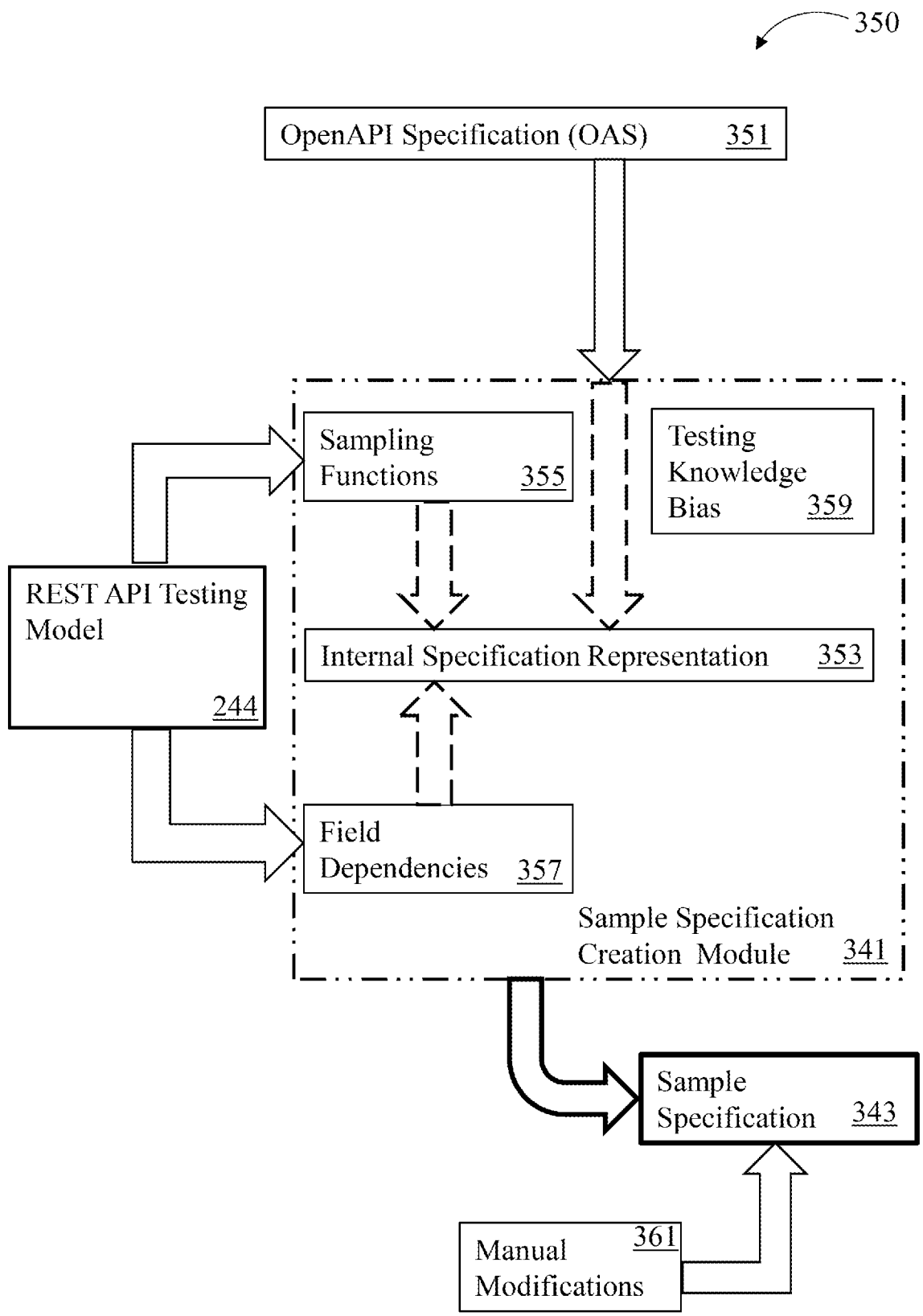
FIG. 3B is a block schematic diagram illustrating the creation of the sample specification per the process illustrated in FIG. 3A, in accordance with some embodiments of the present disclosure.

Referring to FIG. 3A, a flowchart is provided illustrating a process 300 for creating the sample specification 343 (referred to as the sample specification 143 and 243 in FIGS. 1 and 2B, respectively) in accordance with some embodiments of the present disclosure. Also, referring to FIG. 3B, a block schematic diagram is presented illustrating the creation 350 of the sample specification per the process 300 illustrated in FIG. 3A, in accordance with some embodiments of the present disclosure. FIGS. 3A and 3B are discussed together.

In one or more embodiments, the random selection of tester inputs includes generating a plurality of valid samples specifically tailored for the anticipated REST API requests. In some embodiments, to facilitate the anticipated REST API requests, the sample specification 343 is created 300 by the sample specification creation module 341 (shown as module 141 in FIG. 1). In some embodiments, the sample specification creation module 341 is an OAS compiler module which receives OAS specification 351 and any semantic extensions and convert them into the sample specification 343. Typically, the sample specification creation 350 need only be performed once. The sample specification 343 describes how to generate a random sample 265 for a REST API request that will result in a good API response 274 is important for testing the SUT 230 through the API requests activating the SUT business logic and determining that it functions correctly based on the responses. Additionally, the sample specification 343 provides controls over how a sample is created, such as sample distribution and precise value selection for each field.

In at least some embodiments, the creation 350 of the sample specification 343 includes downloading 302 an OpenAPI specification 351 from sources as previously described herein into the sample specification creation module 341. The OpenAPI specification 351 is a specification that has been created in open API language. The OpenAPI specification (OAS) 351 defines a standard, language-agnostic interface for RESTful APIs that facilitates ease of understanding and interacting with a remote service with a minimal amount of implementation logic. In general, the OAS 351 is written in as one or more JSON files (or in YAML) including the API name, description, and version, as well as any additional information; descriptions of all associated resources, including identifiers, HTTP methods, input parameters, response codes, and body data types, with links to definitions; and all definitions that can be used for input or output. The downloading step 302 includes importing both the structure (including the respective fields) and field domains of the associated APIs from the OAS 351 into the sample specification creation module 341. Accordingly, the sample specification 343 is configured to describe the structures of REST API requests, along with any structural constraints, and define how the samples are to be generated.

In some embodiments, the process 300 also includes automatically adding 304 predefined sampling functions 355 based on the aforementioned information collected from the OAS 351. More specifically, calls to the predefined sampling functions 355 are injected 356 by the sample specification creation module 341 to the sample specification 343 based on the REST API testing model 244. Calls to the sampling functions 355 are added automatically for those fields where random sampling either is not sufficient for creating a good sample, or the respective fields simply do not make sense in the context of the intended functionality of the APIs. Such fields include those fields which must be sampled from SUT state, for example resource ids (see the discussions for the SUT state module 146 (FIG. 1) and 246 (FIG. 2A)) and those fields which can be sampled based on their semantics from an external source, for example the fields terms "country" or "language." The sampling functions 355 are typically organized in sets for the respective domains, and are added automatically into the sampling specification 343 based on information in the OAS 351 and the REST API testing model 244. Additionally, expert users may define their own sampling functions and manually add them by overriding any field domain controls.

Also, in some embodiments, field dependencies 357 are automatically added 308 by the sample specification creation module 341 from the REST API testing model 244 through, for example, passing the respective parameters to the relevant sampling functions 355. In some embodiments, the dependencies are used to create sampling functions (not shown) which describe the domain of the properties in the sample specification 343. In at least some embodiments, the OAS 351, the sampling functions 355, and the field dependencies 357 are used to define an internal specification representation 353 that represents the sample specification 343 internally to the sample specification creation module 341.

In one or more embodiments, testing knowledge bias 359 is added 310. In some embodiments, the testing knowledge bias 359 is resident within the sample specification creation module 241, where the testing knowledge bias 359 includes the internal testing knowledge of the tool 140 (see FIG. 1), which affects the creation 300 of the sample specification 343. In some embodiments, such testing knowledge bias 359 facilitates improving the testing quality by biasing the sampling functions 355 toward samples that have higher chances to discover a bug in the respective APIs. In some embodiments, the testing knowledge bias 359 is injected from an external source into the sample specification creation module 341. In some embodiments, the testing knowledge bias 359 can be derived either automatically through the respective heuristics, or manually provided by an expert user. In some embodiments, a non-limiting example of automatically derived testing knowledge is sampling near the domain boundaries, where parameters are established to reduce the possibilities of expanding the bias beyond the test space constraints and beyond the sampling function-based selections. In at least some embodiments, the automatically-created sample specification 343 includes features that facilitate manually modifying 312 the sample specification 343, i.e., effecting manual modifications 361 by an expert user by overriding specific field domains. Additionally, the sample specification 343 provides controls over how a sample is created, such as sample distribution and precise value selection for each field within the respective domain. Therefore, in some embodiments, the sample specification 343 is automatically created by the sample specification creation module 341 from a combination of inputs from the OAS 351, the REST API testing model 244, and testing knowledge bias 359.

Figure 4A:
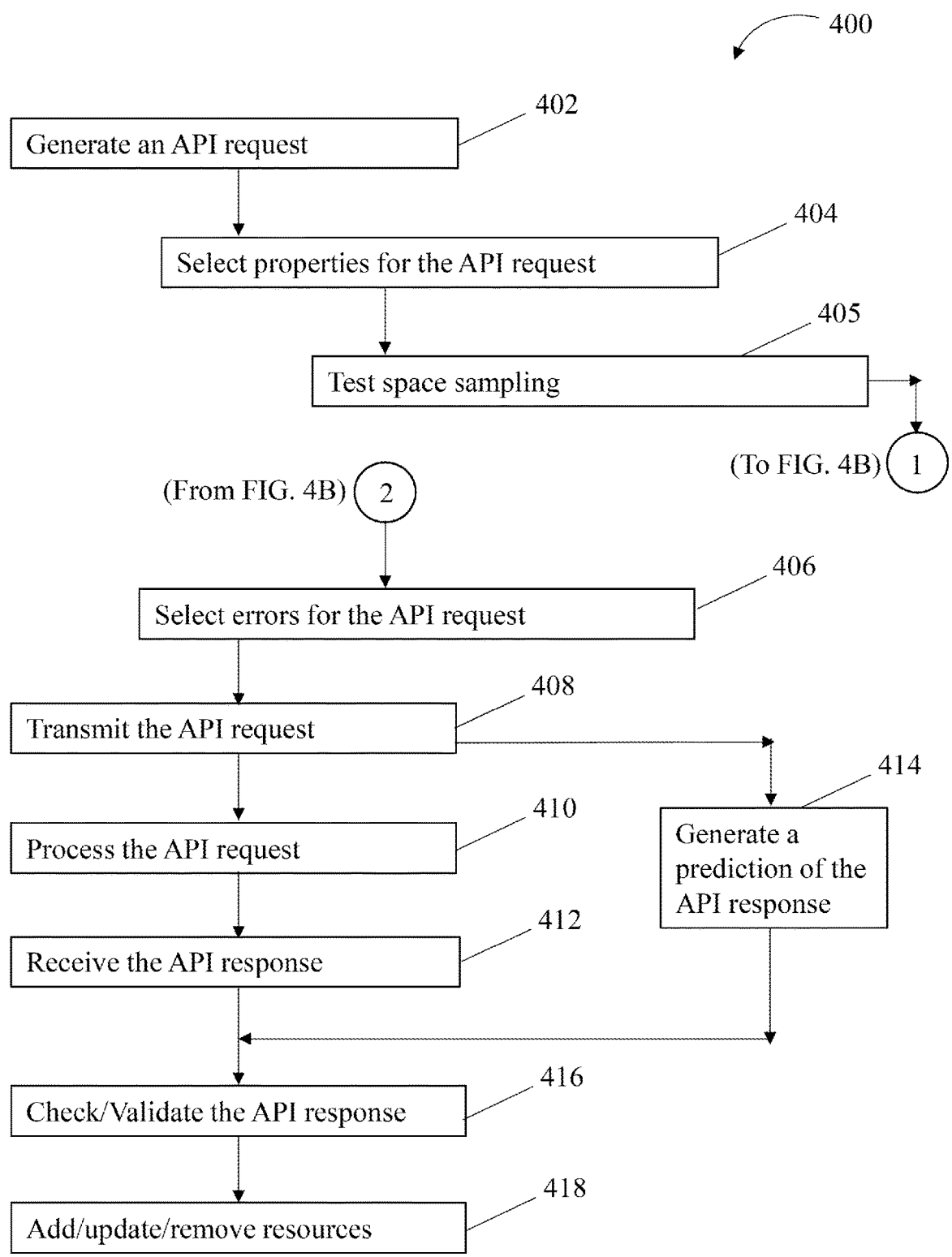
FIG. 4A is a flowchart illustrating a process for validation testing of a SUT with a REST API testing tool, in accordance with some embodiments of the present disclosure.

Referring to FIG. 4A, a flowchart is provided illustrating a process 400 for validation testing of the SUT 230 with the REST API testing tool 240, in accordance with some embodiments of the present disclosure. For purposes of this discussion, FIGS. 2A, 2B, and 4A are discussed together. In one or more embodiments, the process 400 includes automatically generating 402 the API request 260 through the generator 248. An API request 260 includes a plurality of fields including, without limitation, an API request path and its method (sometimes the pair is referred to as an operation), various API request properties, and various API request parameters, including the path, query, header, and body parameters. In some embodiments, the process 300 includes determining the values for the properties and parameters, which may be difficult. Therefore, the generation step 402 includes automatically, and randomly, selecting 404 one or more randomly biased properties 272 for the API request 260.

In at least some embodiments, the method step of selecting 404 the properties for the API request includes sampling 405 the test space associated with the data type sampling through the test space sample generator module 263. Also, referring to FIG. 4B, a flowchart is presented illustrating the process 405 for sampling the test space through the test space sample generator module 263 is provided, in accordance with some embodiments of the present disclosure.

In at least some embodiments, the sample specification 243 provides controls over how a sample is created, such as sample distribution and precise value selection for each field within the respective domain. As a general rule, for an API request to succeed, it is not enough for the requested API to be syntactically correct, i.e., where the API is has structure and values within domains as specified by a schema. A non-limiting example of such a schema is JSON schema provided in the OpenAPI specification 351 (see FIG. 3B), where the embodiments described herein are not limited to the JAVA® programming language. In addition, the values have to be sampled based either on current SUT state (see the discussion with respect to the SUT state module 246 herein), for example resource ids, or common knowledge, for example "country" or "language." Moreover, even if creating random sample values 265 does not affect the API request validity, a good practice is to create samples which would resemble real life inputs, for example, a person's name or phone number. This is achieved by the injecting 306, as described above, from the REST API testing model 244, the sampling functions 355 into the domain specification of the relevant fields within the sample space. One non-limiting example of a sampling function 355 obtaining valid samples from an external source (e.g., the REST API testing model 244), includes values for the SUT state (see the discussion with respect to the SUT state module 246 herein).

Figure 4B:
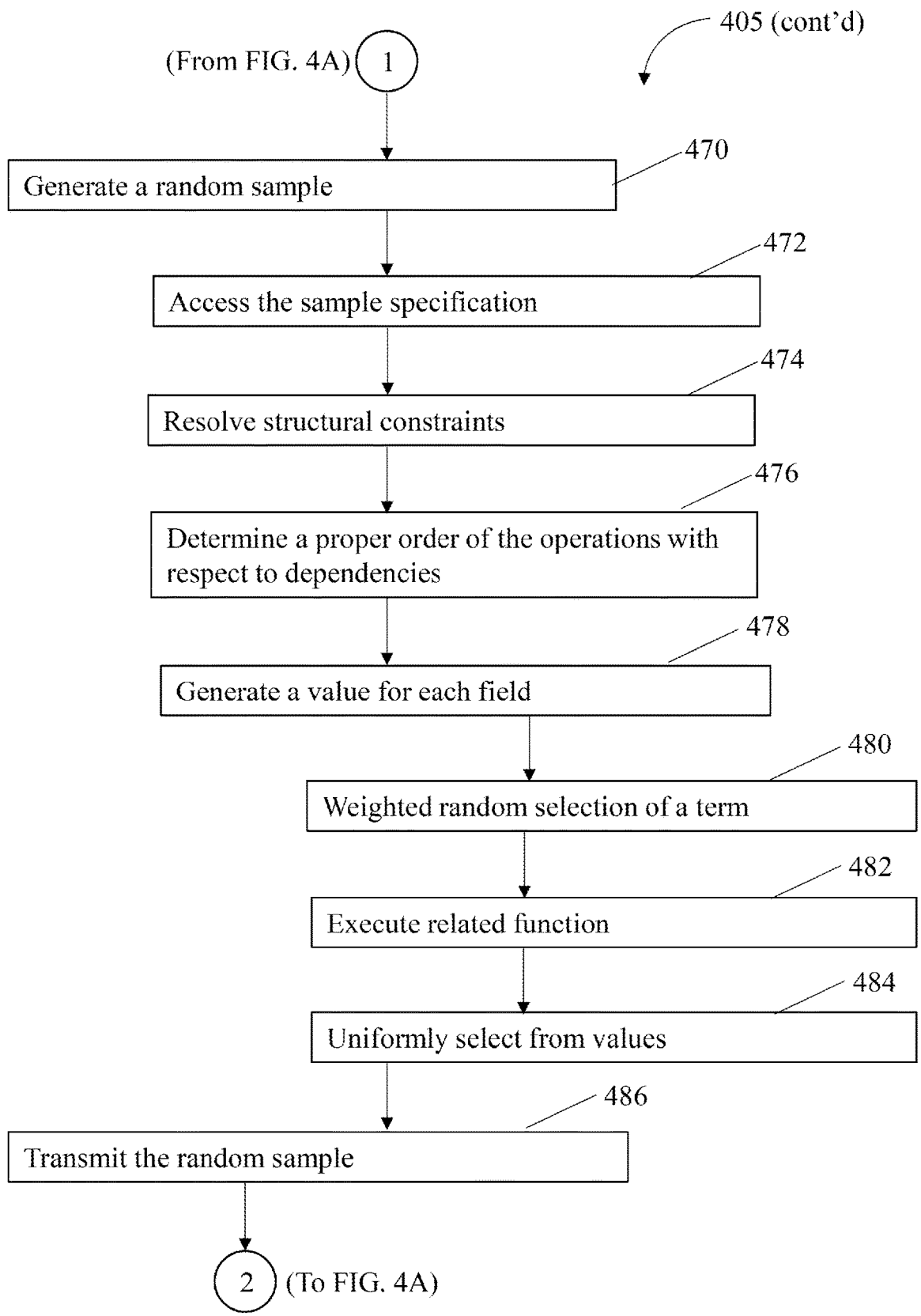
FIG. 4B is a flowchart illustrating a process for sampling a test space, in accordance with some embodiments of the present disclosure.

Continuing to refer to FIG. 4B, a continuation of the flowchart of FIG. 4A illustrating the process 405 and also referring to FIGS. 2A-2B, 3A-3B, and 4A, for each instance of a tester preparing to send a REST API request, a single random sample 265 is generated 470 by the test space sample generator module 263 from the sample specification 363 through the test space, both resident within the test space sample generator module 263. The sample 265 incudes one or more values as described further herein. The generation step 470 of the random sample 265 includes accessing 472 the sample specification 363, and, in some embodiments, the generation 470 of the respective sample from the sample space as defined by the sample specification 342 includes resolving 474, by the test space sample generator module 263, any structural constraints associated with any of the properties of the respective REST API request. As previously described herein, the structural constraints of the various REST API request properties must be considered to create a valid sample. Such structural constraints may include, without limitation, determining whether a particular field is required or optional, and if there is a "oneOf" selection between multiple fields (similar to the description provided by the respective JSON schema). Additional sample limitations for a part of the respective field domain as specified in the sampling specification 243 may include a particular SUT state to sample any particular fields (e.g., any resource id field which references a resource dynamically created and deleted during test execution), and if the samples include the requirement to include the field semantics. For example, instead of providing random strings for a field named "surname," the test space sample generator module 263 will produce strings resembling real surnames.

In some embodiments, the sample generation step 370 includes determining 476, by the test space sample generator module 263, a proper order of the operations based on the respective dependencies between the aforementioned sampling functions 355. In addition, the sample generation step 470 includes generating 478, by the test space sample generator module 263, a value for each field through an established set of rules. Examples of such rules include, without limitation, by the test space sample generator module 263, randomly selecting 480 a term for the field in accordance with the weights of each possible value or a range of possible values, if a term is a function, execute 482 the respective function, and for a list of values returned by the respective function, uniformly select 484 a value therefrom, or select a range if defined by a primitive. The uniform selection step 384 is executed as a function of uniformly distributing the selection of the samples as a function of the number of respective samples. The generated 478 random sample values 265 are transmitted 486 from the test space sample generator module 263 to the test generation module 248 as one of the randomly injected tester inputs 262 (see FIG. 2B). The method steps 470 through 486 can be iteratively executed to generate additional samples as necessary for the respective pending REST API request.

Referring again to FIGS. 1, 2A, and 4A, in some embodiments, the generator 248 is communicatively coupled to REST API testing model 244. As described above, one or more randomly biased properties 272 are selected 404 for the API request 260. Another of such randomly biased properties 272 is the modeled syntax and resource dependencies 264 that are automatically selected from the model 244 by the generator 248 for inclusion in the API request 260. In addition, the SUT state module 246 is communicatively coupled to the generator 248. Yet another randomly biased property 272 is the recorded resource state 266 of the SUT 230 that is automatically selected from the SUT state module 246 by the generator 248. In some embodiments, the recorded resource state 266 is generated through direct observation of the state of the SUT 230 by the SUT state module 246, where the respective communication channels between the SUT 230 and the SUT state module 246 are not shown for clarity of FIG. 2A. In some embodiments, the state of the SUT 230 is established and maintained through the actual API responses 274 that are indicative of any changes made to the affected resources since the REST APIs 232 are the principle mechanism for such resource management. In addition, the SUT state module 246 is updated as a result of the validation testing process 400 (as discussed further herein). Furthermore, in some embodiments, the SUT state module 246 is communicatively coupled to the model 244, where, without limitation, modeled resource dependencies 268 are randomly selected by the SUT state module 246. Accordingly, the recorded resource state 266 is representative of the state of the SUT 230 through direct measurement thereof and the modeled resource dependencies 268. In addition, the information contained in the recorded resource state 266 is used to further bias the random generation of the API requests 260 towards semantically valid requests with the actual state of the SUT 230, as well as to predict the API responses 274 (discussed further herein).

In at least some embodiments, and as preciously described, the generator 248 randomizes the properties 272 of the API request 260. In addition to the previously described properties 272, additional randomly biased properties 272 of the API request 260 include, without limitation, the API request path and its method, the API request parameters, including the path, query, header, and body parameters, and the number of selected errors (as previously described) and their location. Such randomization of the properties of the API request 260 further facilitates biasing the API request 260.

Moreover, in one or more embodiments, in addition to the previously described automatic, randomly-selected, biased properties 272, errors 270 are automatically and randomly selected 406 by the error selection module 249 for the API request 260. Such selected errors 270 facilitate generating "almost syntactically correct" API requests where such errors 270 include, without limitation, typographic errors to mimic user errors. In addition, errors 270 may include semantic errors where the error selection module 249 in the generator 248 intentionally breaks dependency rules, such as referencing deleted or otherwise non-existing resources in the SUT 230. Additional examples of error selection 406 include, without limitation, an extra field in an API request, missing a required field in an API request, the inclusion of a value in an API request that does not reside within any of the respective valid domains, and an incorrect field name in the API request. Accordingly, the error selection module 249 alters valid requests to stress aberrant behaviors and validate the SUT 230 through simulation of wrong or malicious input.

Accordingly, the process 400 uses one or more generators 248 that are configured to automatically generate validation tests through one or more tester inputs 262, API request syntaxes and resource dependencies 264 from the model 244, the recorded present resource state 266 of the SUT 230, errors generated through an embedded error selection module 249, and additional randomly biased properties 272 of the API request 260. Such API request generation 402 creates a substantially syntactically and semantically valid API request 260 (possibly with randomly selected errors) in which the values of different properties of the API request 260 are randomized within their domains based on the information contained in the model 244 and the state 266.

In some embodiments, the API request 260 is transmitted 408 from the generator 248 to the SUT 230 through the cloud 216 and the REST APIs 232. As previously described, at least some of the properties of the API requests 260 have been biased through one or more of errors 270 and the biased properties 272 selected randomly to enhance the robustness of the testing through random manipulation of the API requests 260. The API request 260 is processed 410 by the SUT 230 after initial processing upon receipt by the REST APIs 232 and an API response 274 is generated by the SUT 230, and transmitted to, and received by 412 the checker 250.

In at least some embodiments, the checker 250 is configured to generate 414 a prediction of the incoming API response 274 transmitted from the SUT 230 for the API response 274 through predicting the expected status code as well as the content of the API responses 274. In at least some embodiments, the checker 250 is operably and communicatively coupled to the REST API testing model 244 and the respective API response syntax and resource relations 276 are transmitted to the checker 250. In addition, the SUT state module 246 is operably and communicatively coupled to the checker 250 such that the recorded resource state 278 is transmitted to the checker 250. The recorded resource state 278 is substantially equivalent to the recorded resource state 266. The checker 250 is configured to integrate the respective API response syntax and resource relations 276 and the recorded resource state 278 into a prediction of the present API response 274, where the predicted (or expected) status code (e.g., successful or error API response) and the predicted content of the API response 274 will be compared to the actual API response 274 (discussed further herein). Accordingly, the API response syntax and resource relations 276 and the recorded resource state 278 are used by the checker 250 to generate 414 predictions of at least a portion of the API response 274.

Upon receipt of the API response 274 at the checker 250, the syntax, content, and returned status code of the API response 274 are checked 416, i.e., validated against the predictions generated 414 by the checker 250. In some embodiments, a syntactic check of the API response 274 is conducted and in some embodiments both a syntactic check and a semantic check of the API response are conducted. For the former embodiment, where the generated API response 274 is syntactically correct, the description of the relevant resource(s) are added to the state, deleted from the state, or modified (updated) 418 in the state, as appropriate, thereby altering the recorded state of the SUT 230. In the latter embodiment, for those circumstances where the generated API response 274 is syntactically and semantically correct, the description of the relevant resource(s) are added to the state, deleted from the state, or modified (updated) 318 in the state, as appropriate, thereby altering the recorded state of the SUT 230. The SUT state module 246 captures the actions of the add/update/remove resources actions 280 and the recorded resource state inputs 266 and 278 are altered accordingly. Regardless of using either the syntactic only or the syntactic and semantic checking, only those valid API response 274 will be permitted to alter the state of the SUT 230. An illustrative example includes selecting the recorded state information 266 and 278 of the SUT 230 for a first API request 260. The actual state information of the SUT 230 is captured through checking a first API response 274. The recorded state information 266 and 278 of the SUT 230 is altered, subject to the captured actual state information from the first API response 274. The altered recorded state information 266 and 278 of the SUT 230 is selected for a second API request 260, thereby altering the biasing of the second API request 260 from the biasing of the first API request 260.

In addition, the methods disclosed herein perform syntactic and semantic validation of the API responses 274. The syntactic correctness, or lack thereof, of the API responses 274 is automatically inferred from the model 244 through a comparison by the checker 250 and syntactically incorrect API responses 274 may include one or more of an illegal status code and a syntactically illegal response body. The results of each API response check 316, i.e., the validation test results 282 are transmitted to any location, including, without limitation, one or more of the memory device 106, the data storage system 108, and the output devices 112 (see FIG. 1).

In one or more embodiments, the state of the SUT 230 is constantly recorded and used to enhance the validation testing 300 of the SUT 230. The state of the SUT 230 is represented through the resources that exist in the SUT 230 as perceived by observing the API requests 260 and the API responses 274 that have been received. To establish the known state of the SUT 230, the system 100 is configured to record the descriptions of newly created and deleted resources as well as modifications to resources which already exist. The known state facilitates improving the predictability of the validation tests that in turn improves the checking features (described further herein). In addition, the known state of the SUT 230 is used in the biasing actions as previously described to automatically generate API requests 260 with biased properties. Accordingly, the state of the SUT 230 is constantly recorded as it evolves throughout the validation testing process 300.

In at least some embodiments, the validation testing includes a set of iterative executions of the process 300 with a multitude of shifting biases, or without any selected biases, until the validation testing is completed or the tester has identified any other termination condition.

In some embodiments, the tool 240 is scalable such that there may be multiple generators 248 running in parallel. Since the execution order of the API requests 260 is indeterministic by nature, in some instances, it is possible that the exact state of the SUT 230 may not be precisely determined for a particular time slot (due to the inherent lack of determinism), regardless that only one state can exist at any one point in time. For example, a race between a delete request of a certain first resource, and a post request for a second resource which references the first resource, may result in the checking prediction mechanism considering all the possible outcomes of such a scenario. Accordingly, when possible, more than one possible outcome is considered in the event of parallel requests.

The system, computer program product, and method as disclosed and described herein are configured for conducting model-based, biased, random test generation on a SUT through REST APIs, where the state of the SUT is continuously monitored and updated through the testing activities.

More specifically, the system, computer program product, and method as disclosed and described herein are configured to combine random, biased, model-based validation test generation with a continuously updated state of the SUT to bias the automatic generation of the validation tests towards more challenging and robust tests. In addition, the validation testing of the SUT is enhanced through the introduction of constantly modified resources and modified relationships between such resources. Moreover, semantic checking based on the discovered state of the SUT further enhances the validation testing.

In at least some embodiments, a model is configured to bias the generation of the API requests towards successful transactions to facilitate enhancement of the validation testing as described herein to facilitate creating substantially syntactically and semantically valid API requests through biasing the properties of the generated API requests through biasing mechanisms that include, without limitation, one or more tester inputs, API request syntaxes and resource dependencies from the model, the present state of the SUT, random intentional selection of errors, and randomly biasing other properties of the API requests. Some of the biases are selected randomly to enhance the robustness of the validation testing. The random and intentional selection of errors for the API requests alters valid requests to stress certain behaviors and validate the SUT through simulation of wrong or malicious input. Accordingly, such API request generation creates a substantially syntactically and semantically valid API request (possibly with randomly selected errors) in which the values of different properties of the API request are randomized and biased within their domains based on the information contained in the model and the state.

In addition, in one or more embodiments, the state of the SUT is constantly recorded and used to enhance the validation testing of the SUT to leverage the known state to facilitate improving the predictability of the validation tests that in turn improves the checking features utilizing comparisons between predicted features of the API responses and the actual API responses. The information contained in the state is used to bias the random generator towards semantically valid requests, as well as to predict the API responses.

Therefore, the embodiments disclosed herein provide an improvement to computer technology. For example, the robust validation testing mechanisms described herein improve testing internal and cloud-based systems and applications over known testing mechanisms. The implemented validation testing leverages a model of the REST APIs associated with the SUT and the known state of the SUT to complement a suite of API request generation with automatically-inserted and random biases to facilitate validation test generation that is more comprehensive as compared to known SUT validation testing. The implemented validation test generation and test execution operations as described herein include features to more comprehensively test the SUT through the REST APIs with model-based API requests that are configured based on the known state of the SUT and a combination of randomly introduced biases. Accordingly, the improvement to computer technology is manifested in a practical technical application of the methods described herein to execute testing of SUTs through REST APIs through enhancing the generation of the tests and the execution thereof on the respective SUTs.

Figure 5:
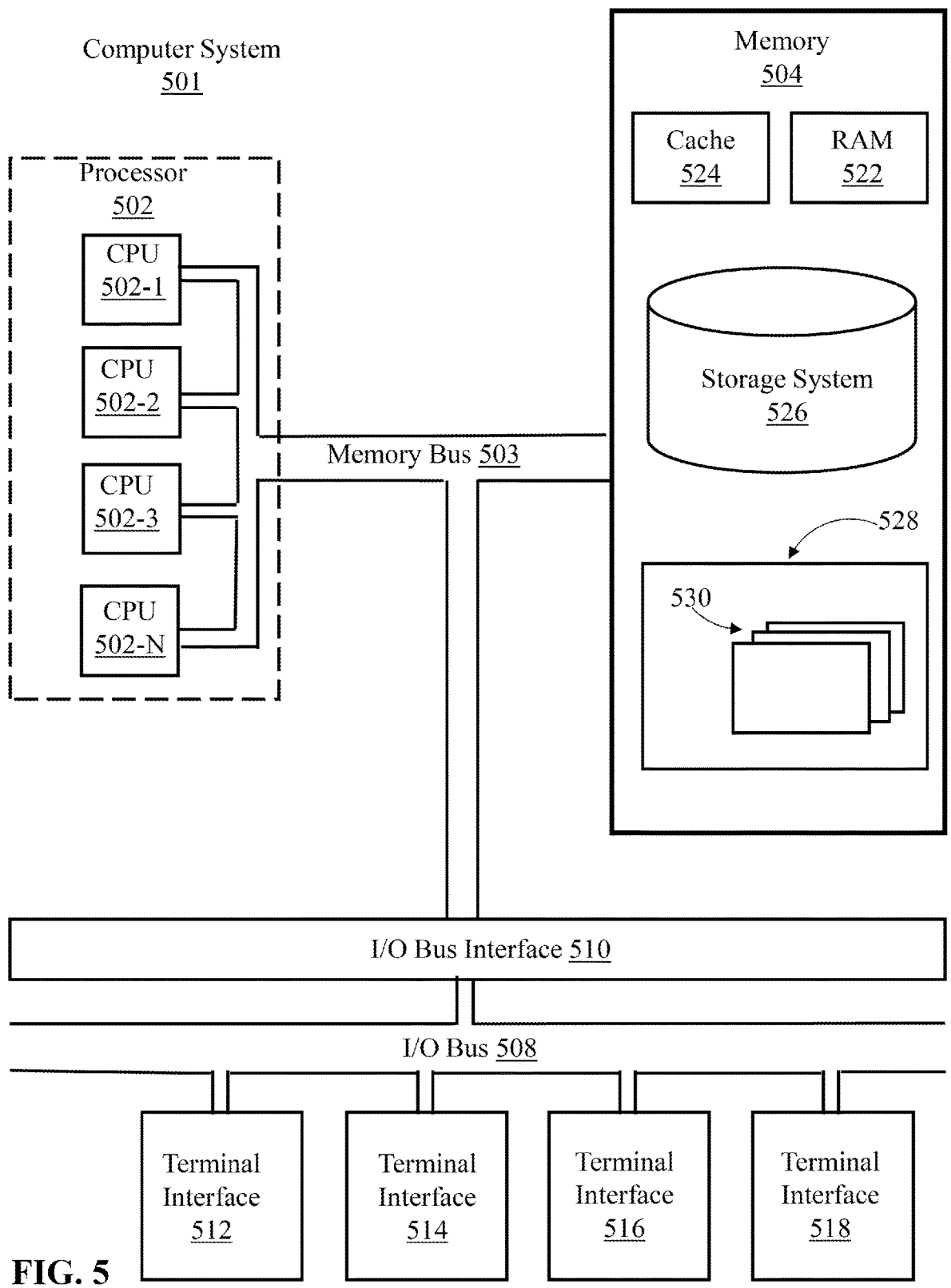
FIG. 5 is a block schematic diagram illustrating a computing system, in accordance with some embodiments of the present disclosure.

Referring now to FIG. 5, a block schematic diagram is provided illustrating a computing system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502-1, 502-2, 502-3, 502-N, herein collectively referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 528 and/or program modules 530 generally perform the functions or methodologies of various embodiments.

It is to be understood that although this disclosure includes a detailed description on cloud computing, implementation of the teachings recited herein is not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows.

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

A cloud computing environment is service oriented with a focus on statelessness, low coupling, modularity, and semantic interoperability. At the heart of cloud computing is an infrastructure that includes a network of interconnected nodes. The system 501 may be employed in a cloud computing environment.

Figure 6:
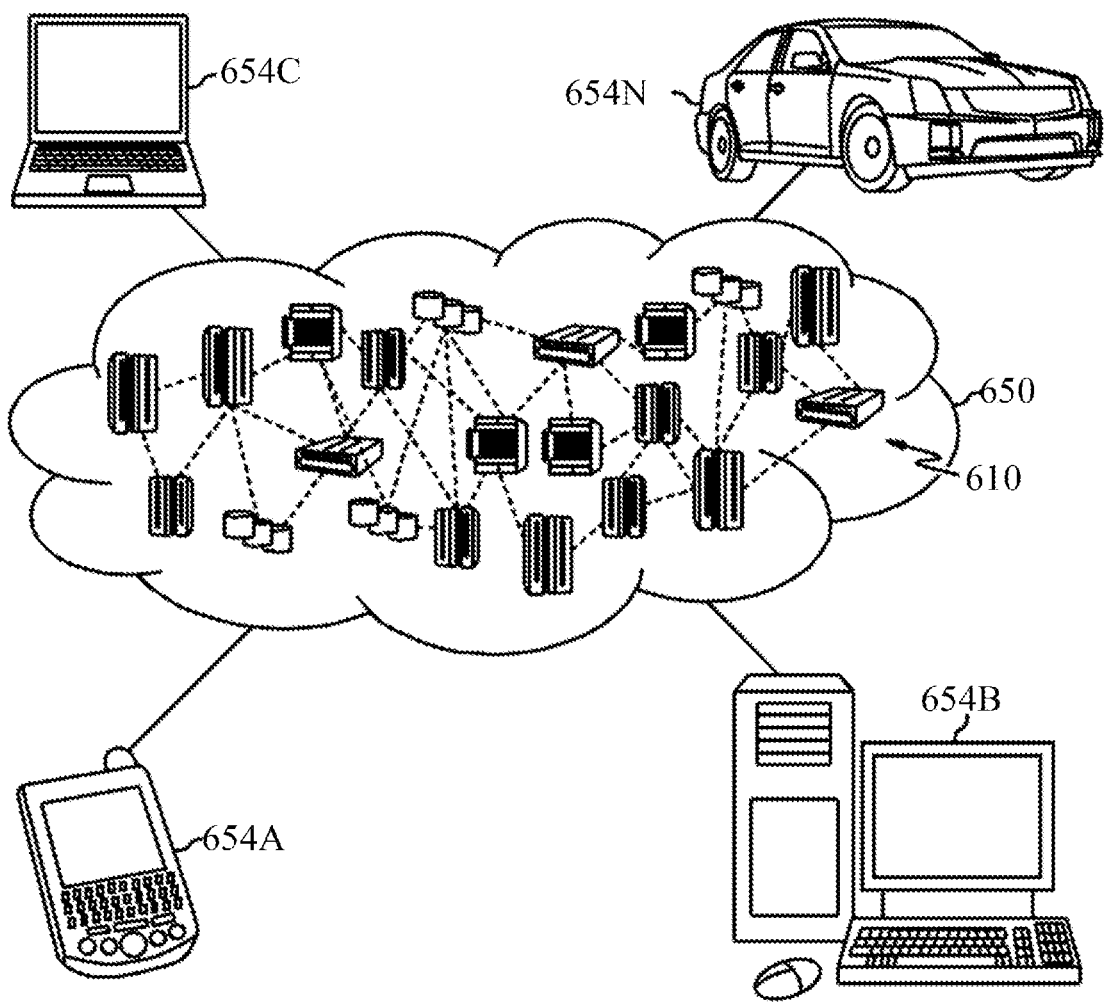
FIG. 6 is a schematic diagram illustrating a cloud computing environment, in accordance with some embodiments of the present disclosure.

Referring to FIG. 6, a schematic diagram is provided illustrating a cloud computing environment 650, in accordance with some embodiments of the present disclosure. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 may communicate with any type of computerized device over any type of network and/or network addressable connection (e.g., using a web browser).

Figure 7:
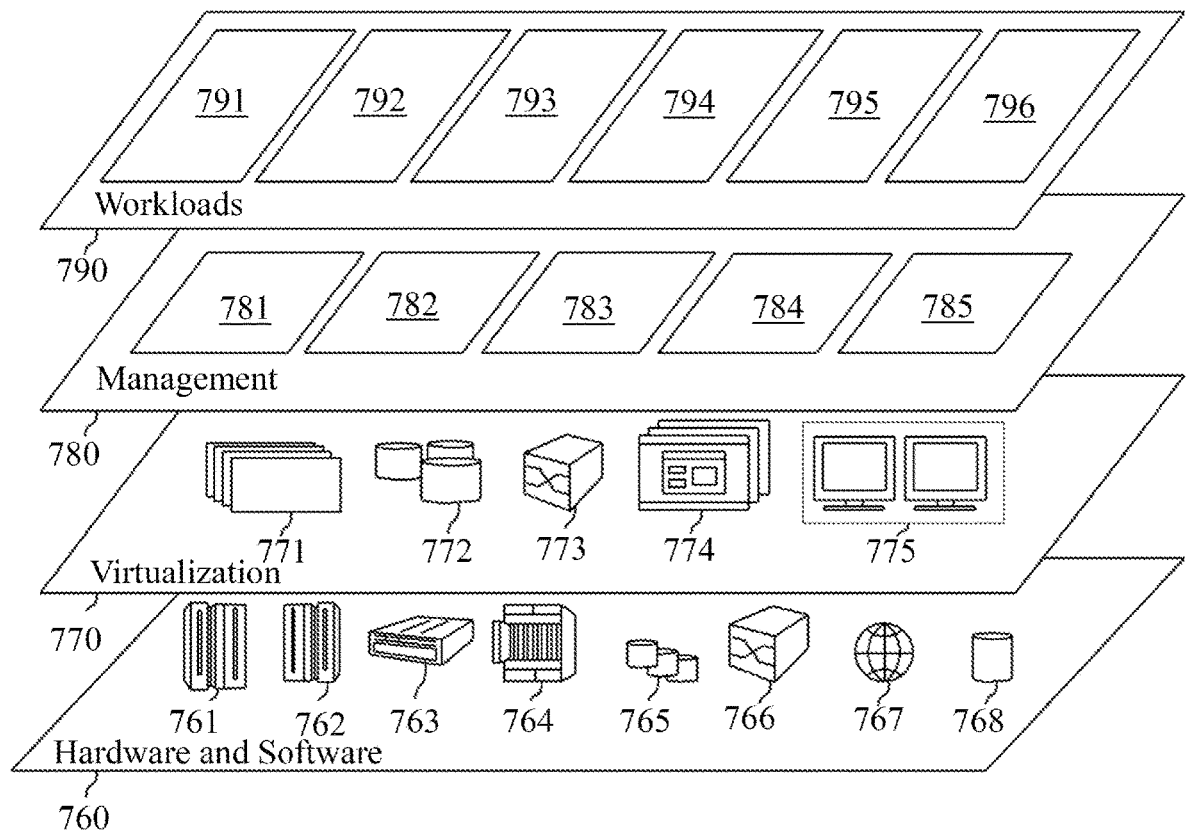
FIG. 7 is a schematic diagram illustrating a set of functional abstraction model layers provided by the cloud computing environment, in accordance with some embodiments of the present disclosure.

Referring to FIG. 7, a schematic diagram is provided illustrating a set of functional abstraction model layers provided by the cloud computing environment 650 (FIG. 6), in accordance with some embodiments of the present disclosure. It should be understood in advance that the components, layers, and functions shown in FIG. 7 are intended to be illustrative only and embodiments of the disclosure are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; layout detection 793; data analytics processing 794; transaction processing 795; and testing of SUTs through REST APIs 796.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals, radio waves or freely propagating electromagnetic waves, electromagnetic waves propagating through a waveguide or transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer system to validate a system under test (SUT) comprising:
    one or more processing devices;
    one or more memory devices communicatively and operably coupled to the one or more processing devices;
    a test generation module communicatively and operably coupled to the one or more processing devices, the test generation module configured to:
        generate one or more application programming interface (API) requests; and
        select one or more random biases for one or more properties of the one or more API requests; and
    a test space sample generator module communicatively and operably coupled to the test generation module and the one or more processing devices, the test space sample generator module configured to generate a random sample of one or more values from an input domain space, wherein the one or more values are associated with one or more respective fields of the API being requested, and the one or more random biases include the random sample of the one or more values.

2. The system of claim 1, further comprising a sample specification creation module communicatively and operably coupled to the test generation module and the one or more processing devices, the sample specification creation module configured to:
    create, automatically, a sample specification that is configured to:
        describe structures of the one or more API requests;
        describe any structural constraints of the one or more API requests; and
        define how the random sample is to be generated.

3. The system of claim 2, wherein the sample specification creation module is further configured to facilitate one or more of:
    receipt of an OpenAPI specification;
    addition of predefined sampling functions to the sample specification creation module;
    addition of field dependencies to the sample specification creation module; and
    addition of testing knowledge bias to the sample specification creation module.

4. The system of claim 3, further comprising an API testing model communicatively and operably coupled to the test space sample generator module, wherein the API testing model is configured to:
    inject the predefined sampling functions and the field dependencies into the sample specification creation module.

5. The system of claim 3, wherein the test space sample generator module is further configured to:
    access the sample specification;
    resolve the structural constraints of the API request;
    determine an order of operations with respect to the respective field dependencies; and
    generate a value for each field.

6. The system of claim 5, wherein the test space sample generator module is further configured to:
    select, randomly, a term for each respective field as a function of a respective weight of a respective value;
    execute a respective function; and
    select a value defined by the respective function.

7. The system of claim 1, wherein the test space sample generator module is further configured to:
    transmit the random sample as a randomly injected tester input.

8. A computer program product embodied on at least one computer readable storage medium having computer executable instructions for validating a system under test (SUT) that when executed cause one or more computing devices to:
    to generate one or more application programming interface (API) requests comprising:
        generate a random sample of one or more values from an input domain space, wherein the one or more values are associated with one or more respective fields of the API being requested.

9. The computer program product of claim 8, further having computer executable instructions to:
    create a sample specification;
    describe, by the sample specification, structures of the one or more API requests;
    describe, by the sample specification, any structural constraints of the one or more API requests; and
    define, by the sample specification, how the random sample is to be generated.

10. The computer program product of claim 9, further having computer executable instructions to:
    receive an OpenAPI specification;
    receive predefined sampling functions;
    receive field dependencies;
    receive testing knowledge bias and facilitate manual modifications to the sample specification.

11. The computer program product of claim 10, further having computer executable instructions to:
    access the sample specification;
    resolve the structural constraints of the API request;
    determine an order of operations with respect to the respective field dependencies; and
    generate a value for each field.

12. The computer program product of claim 11, further having computer executable instructions to:
    select, randomly, a term for each respective field as a function of a respective weight of a respective value;
    execute a respective function;
    select a value defined by the respective function; and
    transmit the random sample as a randomly injected tester input.

13. The computer program product of claim 8, further comprising:
   transmit the random sample as a randomly injected tester input.

14. A computer-implemented method for validating a system under test (SUT), comprising:
   generating one or more application programming interface (API) requests comprising:
      selecting one or more random biases for one or more properties of the one or more API requests, comprising:
         generating a random sample of one or more values from an input domain space, wherein the one or more values are associated with one or more respective fields of the API being requested.

15. The method of claim 14, further comprising:
   creating a sample specification;
   describing, by the sample specification, structures of the one or more API requests;
   describing, by the sample specification, any structural constraints of the one or more API requests; and
   defining, by the sample specification, how the random sample is to be generated.

16. The method of claim 15, wherein creating the sample specification comprises one or more of:
   receiving an OpenAPI specification;
   receiving predefined sampling functions;
   receiving field dependencies;
   receiving testing knowledge bias and making manual modifications to the sample specification.

17. The method of claim 16, wherein:
   one or more of adding the field dependencies to the sample space comprises injecting the predefined sampling functions into the sample space from an API testing model.

18. The method of claim 16, the generating the random sample comprises:
   accessing the sample specification;
   resolving the structural constraints of the API request;
   determining an order of operations with respect to the respective field dependencies; and
   generating a value for each field.

19. The method of claim 18, wherein the generating a value for each field comprises one or more of:
   selecting, randomly, a term for each respective field as a function of a respective weight of a respective value;
   executing a respective function; and
   selecting a value defined by the respective function.

20. The method of claim 14, further comprising:
   transmitting the random sample as a randomly injected tester input.

* * * * *